(12) United States Patent
Jaun

(10) Patent No.: US 12,060,047 B2
(45) Date of Patent: Aug. 13, 2024

(54) ARRANGEMENT FOR ASSISTING A PARKING BRAKE AND CORRESPONDING RETROFIT KIT, AND PARKING BRAKE

(71) Applicant: Speedlounge GmbH, Herbligen (CH)

(72) Inventor: Stefan Jaun, Herbligen (CH)

(73) Assignee: Speedlounge, GmbH, Herbligen (CH)

( * ) Notice: Subject to any disclaimer, the term of this patent is extended or adjusted under 35 U.S.C. 154(b) by 0 days.

(21) Appl. No.: 18/015,148

(22) PCT Filed: Jul. 5, 2021

(86) PCT No.: PCT/EP2021/068454
§ 371 (c)(1),
(2) Date: Jan. 9, 2023

(87) PCT Pub. No.: WO2022/008410
PCT Pub. Date: Jan. 13, 2022

(65) Prior Publication Data
US 2023/0234542 A1    Jul. 27, 2023

(30) Foreign Application Priority Data

Jul. 10, 2020    (CH) .................................... 00852/20

(51) Int. Cl.
*B60T 7/10*    (2006.01)
*B60T 11/04*    (2006.01)

(52) U.S. Cl.
CPC .............. *B60T 7/104* (2013.01); *B60T 11/04* (2013.01)

(58) Field of Classification Search
CPC . B60T 7/104; B60T 7/102; B60T 7/10; B60T 11/04; B60T 11/08; G05G 7/04
See application file for complete search history.

(56) References Cited

U.S. PATENT DOCUMENTS

| 4,907,468 A * | 3/1990 | Hagiwara | ................ G05G 5/03 |
| | | | 74/518 |
| 2004/0256776 A1* | 12/2004 | Champ | ..................... B60T 7/04 |
| | | | 267/64.12 |
| 2008/0110709 A1* | 5/2008 | Vidal Ferrer | ........... B60T 7/101 |
| | | | 188/265 |

FOREIGN PATENT DOCUMENTS

| AT | 394691 B | * | 5/1992 |
| CH | 433024 A | | 3/1967 |

(Continued)

OTHER PUBLICATIONS

USPTO Machine Translation (retrieved from FIT database) of the Description of AT 394691 B, May 25, 1992. (Year: 2024).*

(Continued)

*Primary Examiner* — Daniel D Yabut
(74) *Attorney, Agent, or Firm* — Tucker Ellis LLP

(57) ABSTRACT

The present invention relates to an arrangement (1) for assisting a parking brake (10), which parking brake (10) comprises a brake lever (12) which is supported in a carrier device (14) such that it is pivotable between a release position and a locking position and is able to be coupled to a braking system by means of a transmission means. The arrangement (1) comprises a lifting element (20) with an energy storage unit (22), which is operatively connected to the brake lever (12). The operative connection comprises a redirecting element (30) which is supported in a way pivotable about a pivot axis (32) and is arranged in such a way that the redirecting element couples the lifting element (20) to the brake lever (12).

11 Claims, 3 Drawing Sheets

(56) References Cited

FOREIGN PATENT DOCUMENTS

| DE | 1915811 U | 5/1965 | |
|----|-----------|--------|---|
| DE | 4029155 A1 * | 4/1991 | |
| DE | 4122447 A1 | 1/1993 | |
| EP | 1533203 A1 * | 5/2005 | ............. B60T 7/102 |
| GB | 1070611 A | 6/1967 | |
| WO | WO-2012045454 A1 * | 4/2012 | ............. B60T 11/06 |

OTHER PUBLICATIONS

USPTO Machine Translation (retrieved from FIT database) of the Description of DE 4029155 A1, Apr. 11, 1991. (Year: 2024).*
International Search Report issued in PCT/EP2021/068454 mailed Oct. 12, 2021, 5 pages.
Written Opinion in PCT/EP2021/068454 mailed Oct. 12, 2021, 8 pages.

\* cited by examiner

ARRANGEMENT FOR ASSISTING A PARKING BRAKE AND CORRESPONDING RETROFIT KIT, AND PARKING BRAKE

TECHNICAL FIELD OF THE INVENTION

The present invention relates to an arrangement for assisting a parking brake, in particular for a vehicle. Furthermore, the present invention relates to a retrofit kit comprising the assistance arrangement according to the invention and a parking brake designed as a hand brake, which can be equipped with the assistance arrangement.

STATE OF THE ART

For vehicles, i.e. passenger cars, agricultural vehicles, etc. or for certain trailers, a parking brake is mandatory as a braking device. Such a parking brake permanently blocks at least the wheels on one axle when the vehicle is parked and can be applied in a graduated manner independently of a service brake. A corresponding brake device comprises a brake lever which, in the case of a hand brake, can be actuated manually as a hand lever or, alternatively, by foot as a brake pedal, and can be pivoted about a pivot bearing between a release position and a locking position. A conventional brake arrangement can be actuated by the transmittable force between the brake lever and a brake cable or brake linkage. Furthermore, an actuator can generally be activated on a hand lever of a hand brake to release the holding position.

In general, known parking brake assemblies include a support assembly to reduce the force or load required to operate the assembly and/or to control the release, which could otherwise result in damage to assemblies involved due to a release of energy when the release is undamped. For this purpose, lifting elements or lifting generators can be used, which are arranged between the brake lever and a stationary element. In particular, an arrangement of the lifting element can be provided in which, with the exception of the so-called dead center position, its line of action of force always has a distance to the pivot bearing of the lifting element on the stationary element that changes with the movement of the brake lever. The expansive and preloadable lifting element thus provides graduated support for the movement of the brake lever. According to this arrangement, the preload of the lifting element can be increased before the dead center position and a support torque can be provided after the dead center position is exceeded, which increases depending on the position of the brake lever.

Lifting elements act as energy storage and/or counterweights. Known are lifting elements designed as gas springs with a fluid, for example compressible gas, typically pressurized nitrogen gas, or a hydraulic fluid. A gas spring, designed as a closed, hermetically sealed pneumatic actuator, comprises a piston guided in a cylinder with a piston rod. The piston, the piston rod and also existing seals are lubricated by means of a certain amount of lubricant. The lubricating oil and gas moving in the cylinder create a damping effect as the piston moves. As a result, gas springs can have a relatively flat spring characteristic to provide controlled force and speed, as well as damping at the end of the stroke.

However, a certain not inconsiderable force must still be applied to actuate known parking brake arrangements, in particular for the movement of the brake lever into the parking position, when the applied brake lever is released and for the movement into the release position. This can be an obstacle for the driver, especially if the parking brake is applied regularly, which under certain circumstances can lead to the parking brake not always being applied. This in turn can sometimes have serious consequences, namely when the vehicle is parked on steep, sloping or a supposedly flat, but in reality sloping section of terrain. In this case, it cannot be excluded that the vehicle rolls away by itself due to the effect of gravity and is involved in a traffic accident.

SUMMARY OF INVENTION

Accordingly, it is the object of the present invention to provide an arrangement for assisting a parking brake, whereby the force required to actuate the parking brake is reduced to a minimum, so that application and release, in particular of a parking brake in the form of a hand brake, can be effected quickly and easily. The assisting arrangement according to the invention is furthermore to be designed as a module or retrofit kit in order to be able to be used for retrofitting existing parking brake arrangements.

The objects are achieved by an arrangement for assisting a parking brake, briefly referred to as "the arrangement", according to claim 1, by a retrofit kit according to claim 9 and a parking brake with the assisting arrangement according to the invention according to claim 12.

The arrangement according to the invention is designed to assist a parking brake, which comprises a brake lever, which is pivotably supported in a carrier device between a release position and a lock position and is able to be coupled to a brake system by means of transmission means. The transmission means can include a brake cable, e.g. Bowden cable and/or a brake linkage.

The arrangement according to the invention comprises a lifting element with energy storage unit, which is able to be arranged relative to the carrier device and is able to be brought into operative connection with the brake lever. The arrangement is characterized in that the active connection between the lifting element and the brake lever comprises a redirecting element which can be arranged so as to be pivotable about a pivot axis relative to the carrier device and couples the lifting element to the brake lever. The assistance for the movement of the brake lever is based on a purely mechanical mechanism which is set up to transfer a manually operated brake lever quasi automatically, in particular to its end positions, i.e. a locking position and a release position.

Since the lifting element and the redirecting element can be arranged relative to the support device by means of corresponding holders and are thus independent of the support device of the parking brake, an existing parking brake may be retrofitted. The arrangement and design of the elements of the assisting arrangement can be individually adapted to the structural conditions. Depending on the installation situation, the holders can be designed to be connected to the carrier device of the parking brake or to be fixed in position relative to it.

In one embodiment of the assisting arrangement according to the invention, the redirecting element is designed in the form of a rocker with a first lever section and a second lever section, which extend in opposite directions from the pivot axis. In particular, the redirecting element is connectible with the first lever section to the lifting element in an articulated way and with the second lever section to the brake lever. The rocker-shaped redirecting element can be formed in a simple manner from a sheet metal part, whereby the pivot axis can be accommodated in a bearing sleeve which is connectible to the sheet metal part. By means of the redirecting element, kinematic conditions are created which allow an optimal operation of the brake lever of the parking brake with the assistance of the lifting element.

The lifting element can comprise a gas pressure spring as an energy storage unit. The gas pressure spring can be regarded as a hydropneumatic adjusting element with a self-contained energy storage unit. A piston with a piston rod can be guided in a sealing manner in a cylinder tube, which is filled with a compressible gas so that an expansive and preloadable adjustment element is provided.

In a preferred embodiment of the present invention, the operative connection between the lifting element and the brake lever comprises, in addition to the redirecting element, an adjusting element for connecting the redirecting element to the brake lever. In particular, the adjusting element is connectible to the brake lever in an articulated way, for example by means of a ball-and-socket joint bearing comprising a ball socket and a joint head. The adjusting element is set up to be adjustable in length. Thus, depending on the installation situation of the parking brake and the design of the brake lever, a suitable length of the adjusting element can be selected, whereby the arrangement according to the invention is able to be flexibly combined.

In one embodiment of the present invention, the lifting element can be arranged relative to the redirecting element in such a way that, following a movement of the brake lever between the release position and the locking position, a line of action of force of the lifting element outside its dead center position is at a varying distance from the pivot axis. The dead center position is designated as a position of the lifting element in which its line of action passes through the pivot axis of the redirecting element.

When the manually operable brake lever is moved between the release position, i.e. a lower position, and the locking position, i.e. an upper position, the redirecting element is also moved so that it pivots about the pivot axis. This pivoting movement of the redirecting element is coupled to a displacement of the piston of the expansive lifting element along the line of force action. When the lifting element moves outside the dead center position due to the pivoting movement of the redirecting element originating from the manually actuated brake lever, the distance between the pivot axis and the line of action of force changes in a plane which runs vertically through the horizontal pivot axis. The distance of the line of action of force to the pivot axis causes a torque which acts on the redirecting element and thus indirectly on the brake lever. The torque increases as the distance between the line of action of the force and the pivot axis increases, so that the movement of the brake lever is additionally assisted independently of the energy stored in the lifting element.

In the positions in which the brake lever is near the release position or near the locking position, and therefore the lifting element is farthest away from its dead center position, the distance between the line of action of force and the pivot axis is almost maximum compared with the dead center position. In order to be able to transfer the brake lever quasi-automatically to the release position or locking position after activation, the arrangement of the elements of the assisting arrangement, i.e. lifting element, redirecting element and possibly adjustment element, is selected in such a way that the distance between the line of action of the force and the pivot axis is then so large that a torque generated thereby and acting on the redirecting element is sufficient for this purpose.

In a preferred embodiment of the arrangement according to the invention, the arrangement consisting of lifting element, redirecting element and possibly adjusting element is provided as a retrofit kit for an existing parking brake. The lifting element and the redirecting element are held in holders. The holders are provided to arrange the lifting element, on the one hand, and the redirecting element, on the other hand, relative to the hand-operable brake lever or respectively the support device of the parking brake.

In a preferred embodiment, the retrofit kit comprises a first holder for the lifting element and a second holder for the redirecting element. Alternatively, a common retaining means may be provided in which the lifting element and the redirecting element are retained. One end of the lifting element is connected in an articulated manner to the first holder, e.g. by means of a ball-and-socket joint bearing. The second holder comprises a bearing for the pivot axis of the redirecting element. The first and second holders can be joined from simple parts, e.g. by means of a plug-in connection, and can be fixed in a suitable position relative to the brake lever. However, the lifting element and/or the redirecting element can also be held directly on the carrier device or on a common holder.

Furthermore, the present invention relates to a parking brake comprising the arrangement for assisting according to the invention. Such a parking brake can be used almost universally in different vehicles and trailers.

BRIEF DESCRIPTION OF THE FIGURES

A preferred embodiment of the invention will be presented in the following with reference to drawings, which merely serve explanatory purposes and are not to be interpreted in a limiting way. Features of the invention disclosed through the drawings are to be considered individually and in any combination as belonging to the disclosure of the invention. Shown in the drawings are.

DETAILED DESCRIPTION OF THE EMBODIMENTS OF THE INVENTION

Figure 1:
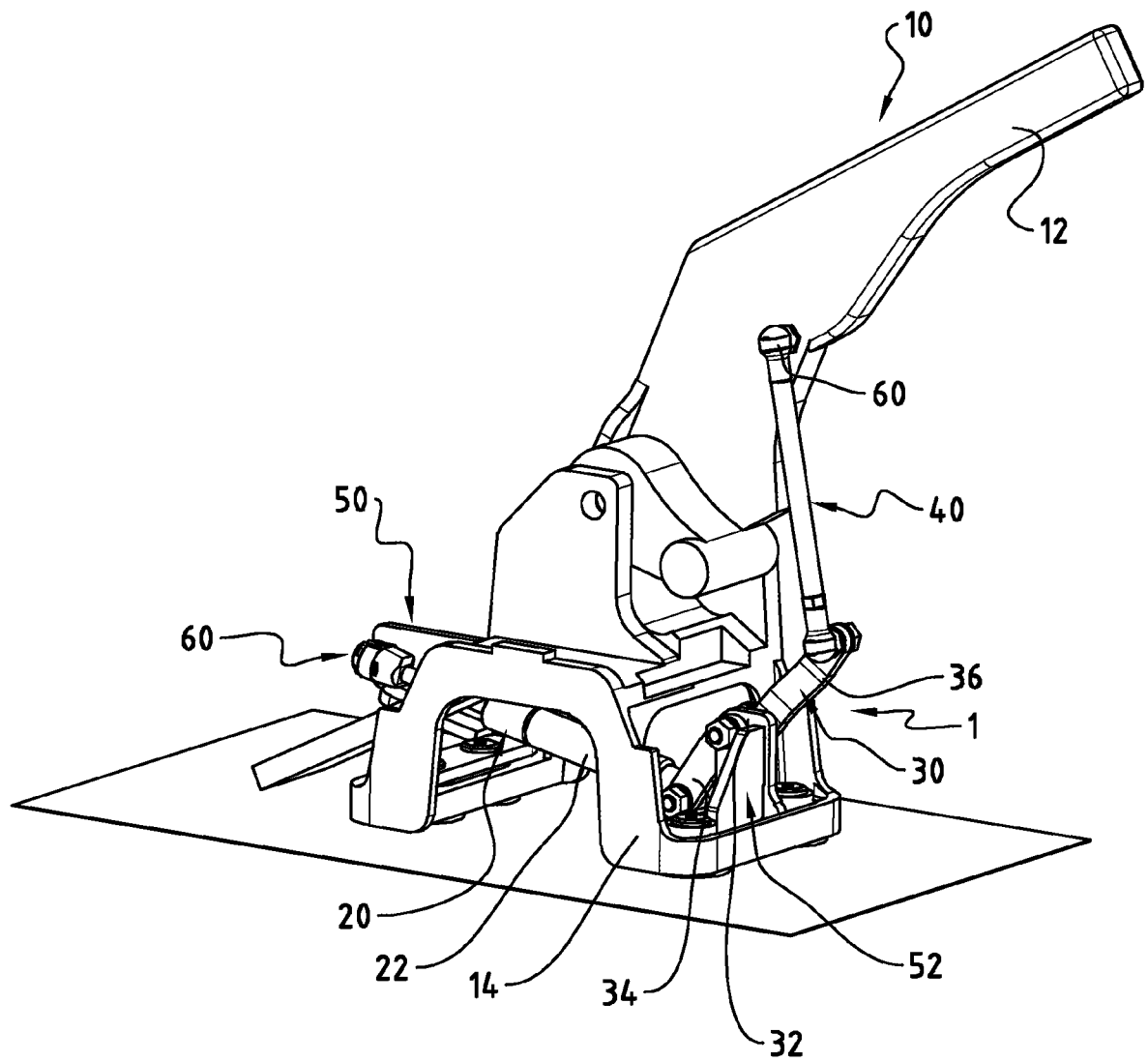
FIG. 1: a schematic perspective view of a parking brake with brake lever and carrier device including an assisting arrangement according to the invention in accordance with a first embodiment.

The parking brake 10 shown in FIG. 1 with an arrangement for assisting, which is hereinafter referred to in short as arrangement 1, comprises a manually operable brake lever 12 as a manually operable release device for actuating a braking device. The brake lever 12 is pivotable about an axis of rotation, which is supported in a carrier device 14.

Not shown is that the brake lever 12 is connected to an adjusting means designed as a brake cable and/or brake linkage in order to transmit a force from the brake lever 12 to a brake system. The brake system can be designed, for example, as a drum brake or disc brake in order to fix the wheels. Furthermore, a pawl is provided which is connected to the brake lever 12 and can be engaged with a catch segment. The pawl can be connected via a cable-shaped or rod-shaped connecting means to an actuator accommodated on the brake lever 12, which, in a pressed position, releases the pawl from engagement on the catch segment. In general, it is also provided that a brake cable is articulated at an articulation point, which cable is designed as a Bowden cable, which is connected to the wheel brakes to be activated by means of the brake linkage. In addition, further functional elements may be integrated in the entire braking system.

The arrangement 1 connectible to the parking brake 10 to assist the course of movement of the latter comprises a lifting element 20 which has an energy accumulator 22, for example by means of a gas pressure spring. The lifting element 20 is operatively connected at one end to a redirecting element 30, which can be pivoted in the form of a rocker about a central pivot axis 32. The pivot axis 32 is preferably arranged parallel to the axis of rotation about which the brake lever 12 is pivotable. The redirecting element 30 has a first lever section 34 for articulated connection to the lifting element 20 and a second lever section 36 for articulated connection to the brake lever 12.

The lifting element 20 is arranged relative to the redirecting element 30, for which a first holder 50 is provided. The first holder 50 can be arranged relative to the carrier device 14, for example be received on the carrier device 14 in a formed recess and be fixed in position. The lifting element 20 is connected at one end to the redirecting element 30 and by an opposite end is held in an articulated manner at the holder 50. Accordingly, a piston of the lifting element 20 moves along a line of force action 24, whereby this line of force action 24, starting from the first end of the lifting element 20 coupled to the movement of the brake lever 12, sweeps a segment of a circle.

The redirecting element 30 is held relative to the elements of the parking brake 10 and relative to the lifting element 20 by means of a second holder 52. The second holder 52 can also be fixed with respect to the carrier device 14.

An adjusting element 40 is arranged between the redirecting element 30 and the brake lever 12 to provide the effective connection, which adjusting element is connectible in an articulated manner to the brake lever 12, on the one hand, and in an articulated manner to the second lever 20 section 36 on the other hand. The adjusting element 40 may be designed as a length-adjustable element, for example as a threaded rod. The bearing of the adjusting element 40 on the brake lever 12 can comprise a ball joint bearing 60.

Figure 2:
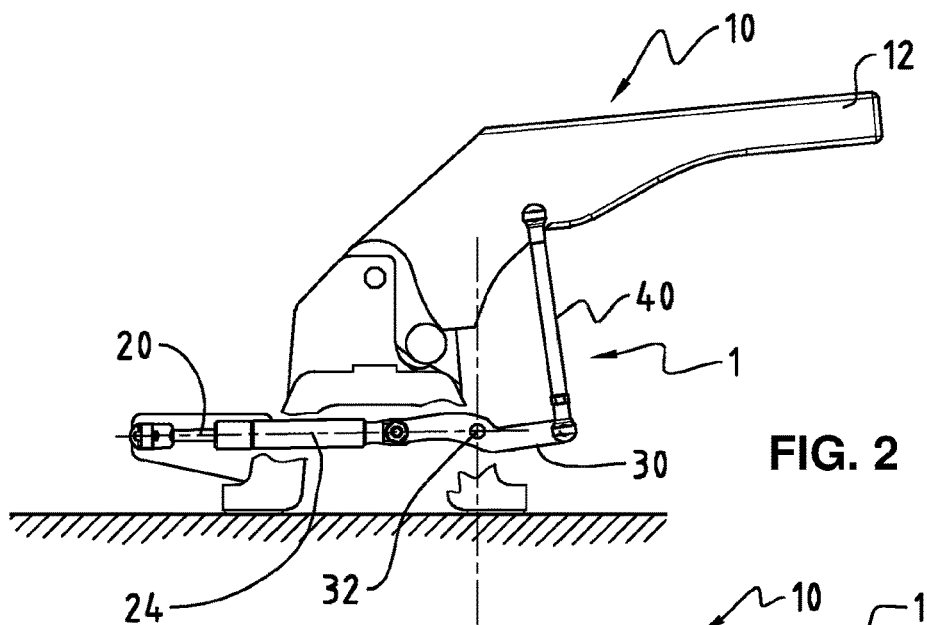
FIG. 2: a schematic, partially broken-up side view of the assisting arrangement with lifting element, redirecting element and adjusting element according to the first embodiment in a dead center position.

In a so-called dead center position, the line of action of force 24 runs almost horizontally through the center of the pivot axis 32, shown in FIG. 2. In this position, no torque acts on the pivot axis 32 of the redirecting element 30. The brake lever 12 is in a position which corresponds almost to the release position.

Figure 3:
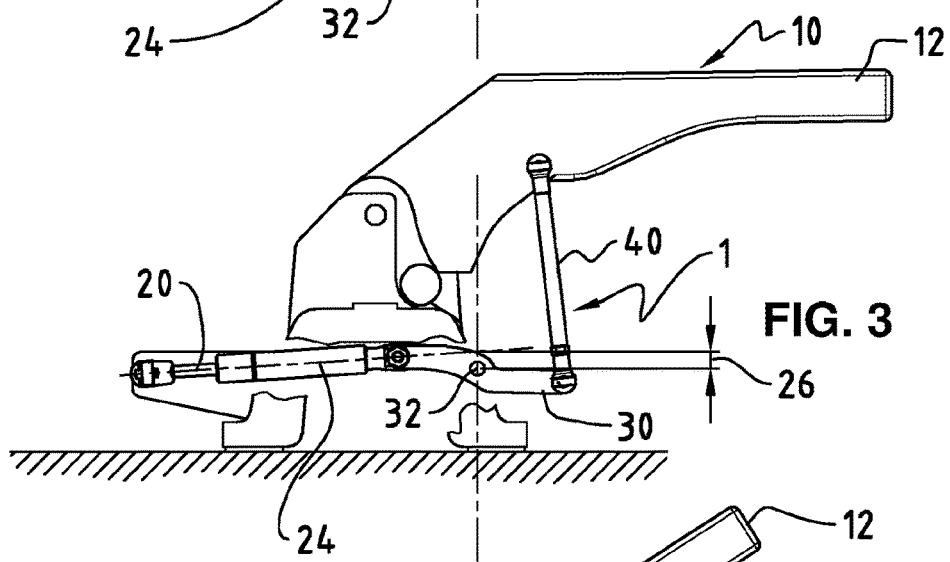
FIG. 3: a schematic partially broken-up side view of the assisting arrangement according to FIG. 2 in a position in which the brake lever of the parking brake is in a release position.

The release position of the brake lever 12 is shown in FIG. 3. The elements of the arrangement 1 for assisting the parking brake 10 are positioned in relation to one another in such a way that a small torque is generated at the pivot axis 32, due to a distance 26 between the pivot axis 32 and the line of action of force 24 in a perpendicular plane 5 through the pivot axis 32. This torque facilitates the movement of the brake lever 12 from the release position shown.

Figure 4:
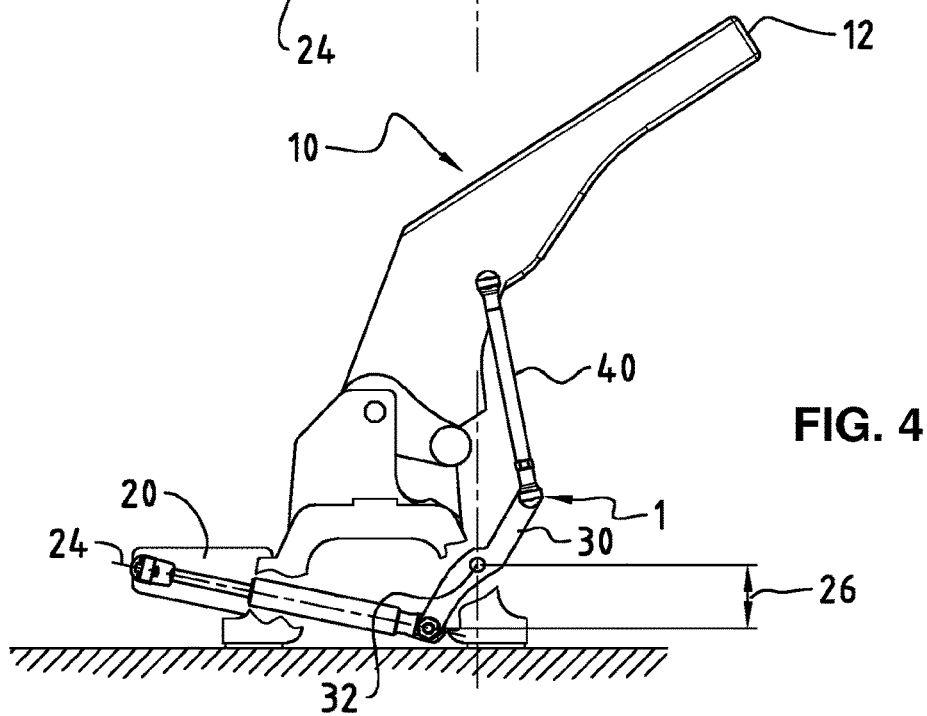
FIG. 4: a schematic partially broken-up side view of the assisting arrangement according to FIG. 2 in a position in which the brake lever of the parking brake is in a lock position.

In FIG. 4, the brake lever 12 is shown in a lock position in which the wheels of one axle are locked. The line of action of force 24 of the lifting element 20 intersects the plane running perpendicularly through the pivot axis 32 at a large distance 26 from the latter. Accordingly, a high torque acts on the redirecting element 30 so that the movement of the brake lever 12 into the locking position is supported. In particular, the generated torque is so high that the movement of the brake lever 12 into the locking position is almost automatic.

Figure 5:
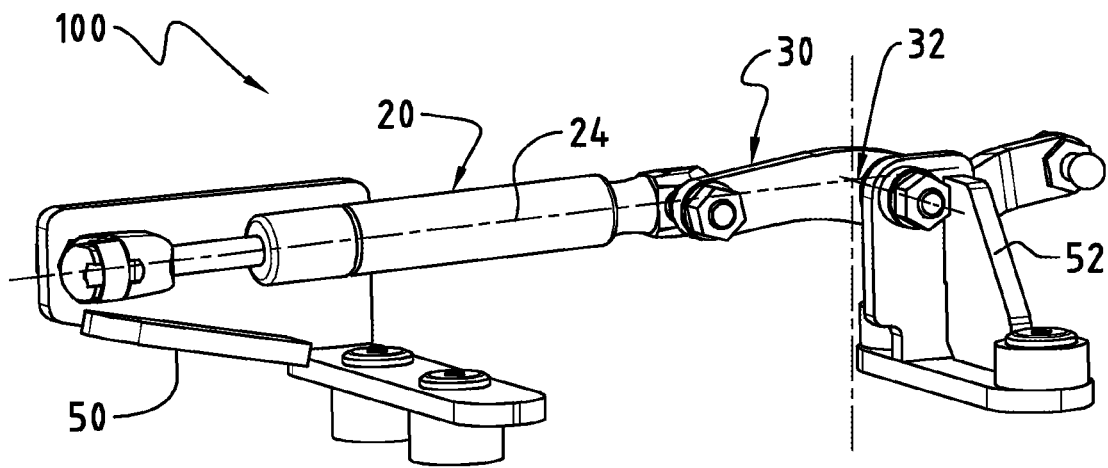
FIG. 5: a perspective view of the lifting element of the assisting arrangement supported on a first holder and of the redirecting element with a second holder in a dead center position.
Figure 6:
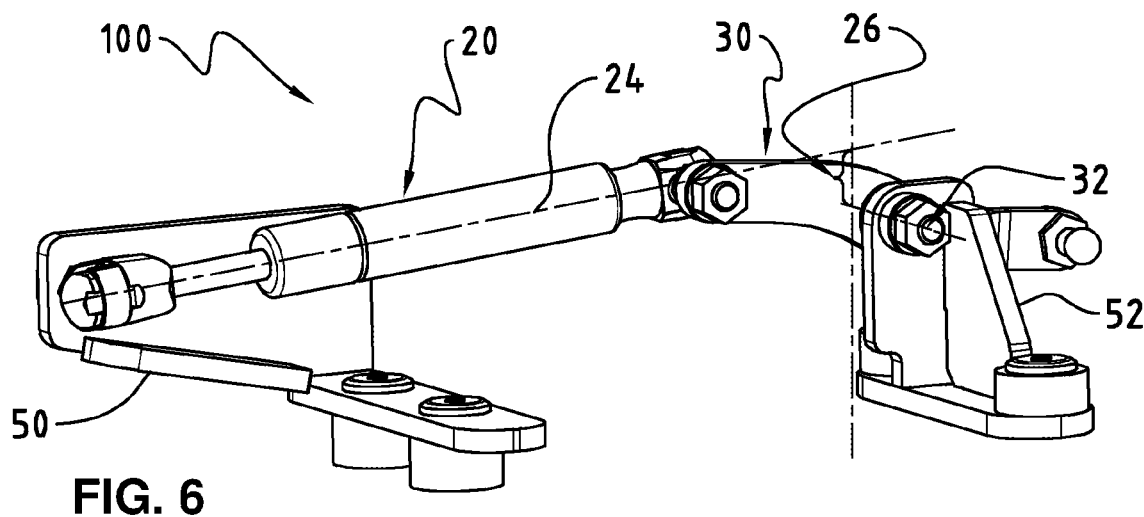
FIG. 6 a perspective view of the lifting element and the redirecting element of the assisting arrangement with their holders in a release position, FIG. 7 a perspective view of the lifting element and the redirecting element of the assisting arrangement with their holders in a lock position.
Figure 7:
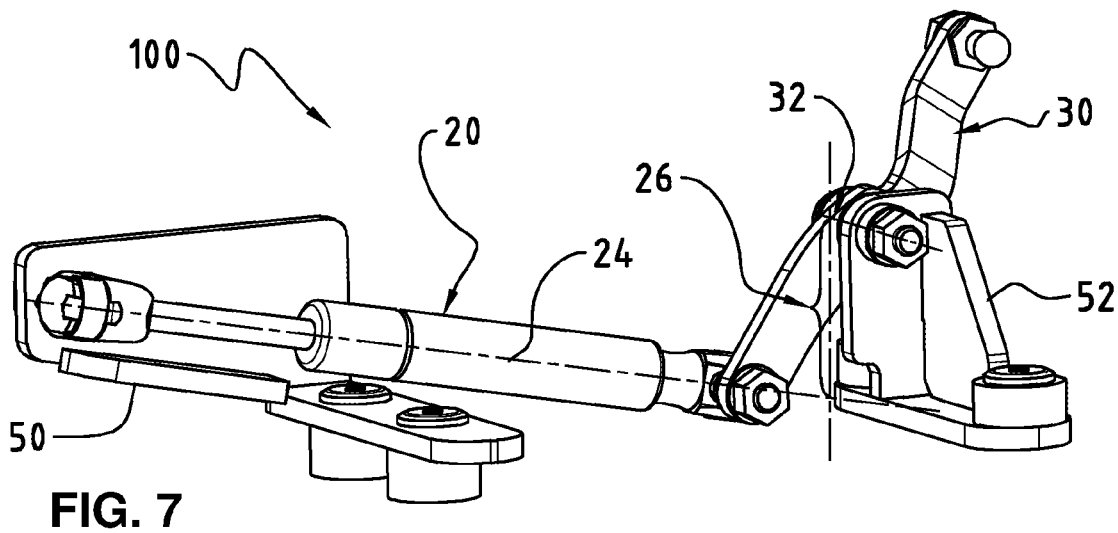

In FIGS. 5, 6 and 7, the elements lifting element 20 and redirecting element 30 of the arrangement 1 for assisting the parking brake 10 are shown in a detailed perspective view in the dead center position (FIG. 5), in the release position (FIG. 6), and in the parking position (FIG. 7) for clarification. The distance 26 between the line of action of force 24 and the pivot axis 32, which varies depending on the position assumed, is illustrated. In particular, the elements lifting element 20 and redirecting element 30 together with the first holder 50 and the second holder 52 form a retrofit kit 100. This retrofit kit 100 can be used in different installation situations in order to provide support for a parking brake 10.

The first holder 50 and also the second holder 52 can be joined from several individual parts, in particular plugged in. The first bracket 50 and the second bracket 52 can be fixed stationary in relation to the existing parking brake 10 by means of corresponding screw connections.

The invention claimed is:

1. An arrangement for assisting a parking brake, wherein the parking brake comprises:
    a brake lever which is pivotably supported in a carrier device between a release position and a locking position and is adapted to be coupled to a braking system by means of a transmission means,
    wherein the arrangement comprises a lifting element with an energy storage unit,
    wherein the lifting element is operatively connected to the brake lever,
    wherein the operative connection comprises a redirecting element which is supported in a way pivotable about a pivot axis and is arranged in such a way that the redirecting element couples the lifting element to the brake lever, and
    wherein the operative connection further comprises an adjusting element that is arranged between the brake lever and the redirecting element and is adjustable in its length.

2. The arrangement for assisting a parking brake according to claim 1, wherein the redirecting element is in the form of a rocker pivotable about the pivot axis, comprising a first lever section connectible in an articulated way to the lifting element and a second lever section connectible to the brake lever.

3. The arrangement for assisting a parking brake according to claim 1, wherein the lifting element comprises a gas pressure spring.

4. The arrangement for assisting a parking brake according to claim 1, wherein the redirecting element is connectible to the brake lever by means of the adjusting element.

5. The arrangement for assisting a parking brake according to claim 1, wherein the lifting element is adapted to be arranged relative to the redirecting element so that, during a movement of the brake lever between the release position and the locking position, a line of action of force of the lifting element outside its dead center position has a varying distance from the pivot axis.

6. The arrangement for assisting a parking brake according to claim 5, wherein the distance is at a maximum when the brake lever is in a vicinity of the release position or the locking position.

7. The arrangement for assisting a parking brake according to claim 6, wherein the distance is so great that a torque generated thereby and acting on the redirecting element is sufficient to transfer the brake lever automatically into the release position or the locking position.

8. A retrofit kit for a parking brake, comprising the arrangement for assisting the parking brake according to claim 1, and further comprising holders for arranging the lifting element and the redirecting element relative to the brake lever.

9. The retrofit kit for a parking brake according to claim 8, wherein a first said holder is adapted to support in an articulated way one end of the lifting element and a second said holder is adapted to support the pivot axis of the redirecting element.

10. The retrofit kit for a parking brake according to claim 8, wherein a ball joint bearing is adapted for articulated mounting of the lifting element and/or the adjusting element.

11. A vehicle comprising a parking brake having the arrangement for assisting a parking brake according to claim 1, said vehicle being a passenger vehicle, agricultural vehicle, municipal vehicle or a trailer.

\* \* \* \* \*